United States Patent
Farres et al.

(10) Patent No.: US 11,685,347 B2
(45) Date of Patent: Jun. 27, 2023

(54) DEVICE/METHOD FOR PARKING BRAKE ASSISTANCE

(71) Applicant: Volvo Truck Corporation, Gothenburg (SE)

(72) Inventors: Lionel Farres, Heyrieux (FR); Fabrice Dussapt, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 842 days.

(21) Appl. No.: 16/603,497

(22) PCT Filed: Apr. 20, 2017

(86) PCT No.: PCT/IB2017/000707
§ 371 (c)(1),
(2) Date: Oct. 7, 2019

(87) PCT Pub. No.: WO2019/008403
PCT Pub. Date: Jan. 10, 2019

(65) Prior Publication Data
US 2021/0009093 A1    Jan. 14, 2021

(51) Int. Cl.
*B60T 7/12* (2006.01)
*B60T 17/22* (2006.01)
*B60T 13/74* (2006.01)

(52) U.S. Cl.
CPC ............. *B60T 7/122* (2013.01); *B60T 17/22* (2013.01); *B60T 13/741* (2013.01); *B60T 2201/03* (2013.01); *B60T 2201/10* (2013.01)

(58) Field of Classification Search
CPC ........ B60T 7/122; B60T 17/22; B60T 13/741; B60T 2201/03; B60T 2201/10
See application file for complete search history.

(56) References Cited

U.S. PATENT DOCUMENTS

2002/0055410 A1* 5/2002 Nagasaka ........... F16H 59/0204
                                                     477/94
2004/0124697 A1    7/2004 MacGregor et al.
(Continued)

FOREIGN PATENT DOCUMENTS

WO        0166376 A1    9/2001
WO    2006125256 A1   11/2006

OTHER PUBLICATIONS

International Search Report and Written Opinion for International Patent Application No. PCT/IB2017/000707, dated Jan. 18, 2018, 13 pages.

*Primary Examiner* — Yazan A Soofi
*Assistant Examiner* — Naeem Taslim Alam
(74) *Attorney, Agent, or Firm* — Withrow & Terranova, PLLC

(57) ABSTRACT

A method for parking brake adaptable assistance on a vehicle, the vehicle comprising a parking brake and a set of sensors, and at least one electronic control unit controlling the parking brake and the set of sensors, each sensor being monitored by the at least one control unit to measure a specific parameter, and a set of actuators, each actuator being activated by the at least one electronic control unit to engage a specific action or reminder, characterized in that the method comprises a first list (102) of situations defined by a set of valued parameters measured by the sensors, and a second list (101) of parking brake actions or reminders, and a list of relations (103) establishing a relation between each situation of the first list and an action or reminder from the second list and further comprising the following steps: i. determine the values of the parameters measured by the sensors; ii. determine the situation defined by the set of values determined at step i. iii. engage the action or reminder (Continued)

which is in relation with the situation determined at step ii., according to the list of relations (103).

9 Claims, 1 Drawing Sheet

(56) References Cited

U.S. PATENT DOCUMENTS

| | | | | |
|---|---|---|---|---|
| 2005/0246070 | A1* | 11/2005 | Matsuura | F02N 11/0807 |
| | | | | 701/2 |
| 2007/0052703 | A1* | 3/2007 | Seto | G06T 1/60 |
| | | | | 345/419 |
| 2007/0249465 | A1* | 10/2007 | Barber | B60T 13/746 |
| | | | | 477/197 |
| 2009/0314590 | A1* | 12/2009 | Dagh | B60T 7/12 |
| | | | | 188/110 |
| 2013/0060412 | A1* | 3/2013 | Nakagawara | B60T 17/221 |
| | | | | 701/22 |
| 2015/0175137 | A1* | 6/2015 | Murata | B60T 7/042 |
| | | | | 701/70 |
| 2015/0291135 | A1* | 10/2015 | Vernacchia | B60T 13/741 |
| | | | | 701/70 |
| 2016/0311436 | A1* | 10/2016 | Ogata | B60W 30/18072 |
| 2017/0116794 | A1* | 4/2017 | Gortsas | G07C 5/0808 |
| 2018/0181267 | A1* | 6/2018 | Masamura | G06F 3/0482 |

* cited by examiner

DEVICE/METHOD FOR PARKING BRAKE ASSISTANCE

This application is a 35 USC 371 national phase filing of International Application No. PCT/IB2017/000707, filed Apr. 20, 2017, the disclosure of which is incorporated herein by reference in its entirety.

TECHNICAL FIELD

The invention relates to a device and a method for alerting and/or automatically or semi-automatically activating the parking brake system of a vehicle based on different sets of conditions and on different safety levels.

The general purpose of the invention is to avoid letting a vehicle, in particular a truck, with parking brake released in a dangerous situation, with the risk of having the vehicle roll down uncontrolled and put in danger the security of persons and of goods.

The invention can be applied in heavy-duty vehicles, such as trucks, buses and construction equipment, equipped for example with a pneumatic braking system.

BACKGROUND

Most trucks nowadays are equipped with some visible sign, for instance a red P sign on the dashboard, associated with some sound indicators, intended to alert the driver on the status of the parking brake. These measures are not efficient enough, for every driver and any situations, in particular standstill situations.

Prior art on this problem already teaches different solutions for an automatic intervention of the parking brake system based on the monitoring of different sets of conditions, such as:
  Presence/absence of the driver on the driver's seat, this condition being measured for instance through a seat occupancy sensor;
  Speed of the vehicle;
  Status of engine (running at neutral/not running)
  Position of the braking pedal, and/or of the accelerator pedal
  Drivers door open/closed/locked
  Gear box engaged or not It is also disclosed, in addition to the monitoring of these parameters, to send appropriate visual or acoustic signals to the driver to remind him about the vehicle status and the parking brakes in particular.

It is also disclosed to have a pushbutton to enable the driver to manually and selectively engage or disengage, when appropriate, the automatic activation of the brake system.

Nevertheless each of the solutions disclosed in prior art is adapted to avoid one or a set of specific dangerous configurations.

Moreover, to improve current situation, some customers would like to delete any potential dangerous configuration, namely when the truck is left with parking brake released, at standstill with engine running at low idle speed; others would like to avoid any automatic intervention of Electronic Parking Brake (EPB) system, with a sufficient level of warning to drivers.

None of the prior art solutions can adapt to the actual and different requests of all customers, in terms of safety level requirements with respect to all kinds of specific potentially dangerous configurations that should be considered.

It therefore appears that there is room for improvement on the subject of parking brake assistance for vehicles in general, and for trucks in particular, to propose parking brake assistance to the driver that can be adapted to the needs of the customer, both in terms of safety level requirements and in terms of specific potentially dangerous configurations being taken into account.

SUMMARY

An object of the invention is to provide a device/method for parking brake assistance, which device/method is adaptable to different safety levels and many different potentially dangerous configurations.

The present invention provides a method for parking brake adaptable assistance on a vehicle, the vehicle comprising a parking brake and a set of sensors, and at least one electronic control unit controlling the parking brake and the set of sensors, each sensor being monitored by the at least one control unit to measure a specific parameter, and a set of actuators, each actuator being activated by the at least one electronic control unit to engage a specific action or reminder, characterized in that the method comprises a first list of situations defined by a set of valued parameters measured by the sensors, and a second list of parking brake actions or reminders, and a list of relations establishing a relation between each situation of the first list and an action or reminder from the second list and further comprising the following steps:
  a. determine the values of the parameters measured by the sensors;
  b. determine the situation defined by the set of values determined at step a.;
  c. engage the action or reminder which is in relation with the situation determined at step b., according to the list of relations (103).

According to an aspect of the invention, the method comprises at least one safety level, and a list of relations for each safety level.

According to an aspect of the invention, the parameters measured by the sensors comprise at least one of the following:
  a. PBRV=1 if parking brake has been released voluntarily, PBRV=0 if parking brake has been released involuntarily;
  b. DOS=1 if the driver is on his seat, DOS=0 if the driver is not on his seat, DOS=10 if the driver is changing position from sitting on his seat to standing up; DOS=01 if the driver is changing position from standing up to sitting down.
  c. DDS=1 if the driver's door lock is switched on, DDS=0 if the driver's door lock is switched off.
  d. AP indicating the level of pressure on the accelerator pedal between 0% and 100%.
  e. BP indicating the level of pressure on the brake pedal between 0% and 100%.
  f. D, R, or N indicating gear is respectively engaged in drive mode or in rear mode, or not engaged in neutral mode.

According to an aspect of the invention, the first list of situations comprises the following situations:
  situation a. PBRV=1, DOS=10, DDS=1, BP=0%
  situation b. PBRV=1, DOS=10, DDS=1, BP>0%
  situation c. PBRV=1, DOS=10, DDS=0, BP=0%
  situation d. PBRV=1, DOS=10, DDS=0, BP>0%
  situation e. PBRV=1, DOS=01, DDS=1, BP=0%
  situation f. PBRV=1, DOS=01, DDS=1, BP>0% situation g. PBRV=1, DOS=01, DDS=0, BP=0%
situation h. PBRV=1, DOS=01, DDS=0, BP>0%
situation i. PBRV=0, DOS=10, DDS=1, BP=0%, AP=0%
situation j. PBRV=0, DOS=10, DDS=1, BP>0%
situation k. PBRV=0, DOS=10, DDS=1, AP>0%
situation l. PBRV=0, DOS=10, DDS=0, BP=0%, AP=0%
situation m. PBRV=0, DOS=10, DDS=0, BP>0%, D
situation n. PBRV=0, DOS=10, DDS=0, BP>0%, N
situation o. PBRV=0, DOS=10, DDS=0, BP>0%, R
situation p. PBRV=0, DOS=10, DDS=0, AP>0%, D
situation q. PBRV=0, DOS=10, DDS=0, AP>0%, N
situation r. PBRV=0, DOS=10, DDS=0, AP>0%, R
situation s. PBRV=0, DOS=01, DDS=1, BP=0%, AP=0%
situation t. PBRV=0, DOS=01, DDS=1, BP>0%
situation u. PBRV=0, DOS=01, DDS=1, AP>0%
situation v. PBRV=0, DOS=01, DDS=0, BP=0%, AP=0%
situation w. PBRV=0, DOS=01, DDS=0, BP>0%, D
situation x. PBRV=0, DOS=01, DDS=0, BP>0%, N
situation y. PBRV=0, DOS=01, DDS=0, BP>0%, R
situation z. PBRV=0, DOS=01, DDS=0, AP>0%, D
situation aa. PBRV=0, DOS=01, DDS=0, AP>0%, N
situation bb. PBRV=0, DOS=10, DDS=0, AP>0%, R According to an aspect of the invention, the second list of parking brake actions or reminders comprises at least one or more of the following actions:
1. Parking brake auto apply (AA): the park brake is activated.
2. Parking brake auto apply after check+Sound (AACS), if no acknowledgement by driver within a time window.
3. Cancel current action
4. No action According to an aspect of the invention, the second list of parking brake actions or reminders comprises at least one or more of the following reminders:
5. Short alert+Pop up (SAPU)
6. Long alert+Pop up (LAPU)
7. Short alert+Sound+Pop up (SASPU)
8. Long alert+Sound+Pop up (LASPU)

According to an aspect of the invention, the at least one safety level comprises a basic safety level, a medium safety level, and a high safety level.

According to an aspect of the invention, for the basic safety level, the list of relations establishes a relation between:
situation a. and action or reminder 3
situation b. and action or reminder 8
situation c. and action or reminder 5
situation d. and action or reminder 8
situation e. and action or reminder 7
situation f. and action or reminder 8
situation g. and action or reminder 7
situation h. and action or reminder 8
situation i. and action or reminder 5
situation j. and action or reminder 8
situation k. and action or reminder 8
situation l. and action or reminder 2
situation m. and action or reminder 6
situation n. and action or reminder 5
situation o. and action or reminder 6
situation p. and action or reminder 8
situation q. and action or reminder 5
situation r. and action or reminder 8
situation s. and action or reminder 7
situation t. and action or reminder 8
situation u. and action or reminder 8
situation v. and action or reminder 8
situation w. and action or reminder 7
situation x. and action or reminder 7
situation y. and action or reminder 7
situation z. and action or reminder 8
situation aa. and action or reminder 7
situation bb. and action or reminder 8

According to an aspect of the invention, for the medium safety level, the list of relations establishes a relation between:
situation a. and action or reminder 2
situation b. and action or reminder 3
situation c. and action or reminder 2
situation d. and action or reminder 5
situation e. and action or reminder 2
situation f. and action or reminder 3
situation g. and action or reminder 2
situation h. and action or reminder 5
situation i. and action or reminder 1
situation j. and action or reminder 5
situation k. and action or reminder 5
situation l. and action or reminder 1
situation m. and action or reminder 2
situation n. and action or reminder 5
situation o. and action or reminder 2
situation p. and action or reminder 8
situation q. and action or reminder 5
situation r. and action or reminder 8
situation s. and action or reminder 8
situation t. and action or reminder 7
situation u. and action or reminder 7
situation v. and action or reminder 8
situation w. and action or reminder 2
situation x. and action or reminder 7
situation y. and action or reminder 2
situation z. and action or reminder 8
situation aa. and action or reminder 7
situation bb. and action or reminder 8

According to an aspect of the invention, for the high safety level, the list of relations establishes a relation between:
situation a. and action or reminder 1
situation b. and action or reminder 5
situation c. and action or reminder 2
situation d. and action or reminder 5
situation e. and action or reminder 8
situation f. and action or reminder 7
situation g. and action or reminder 2
situation h. and action or reminder 7
situation i. and action or reminder 1
situation j. and action or reminder 5
situation k. and action or reminder 5
situation l. and action or reminder 1
situation m. and action or reminder 2
situation n. and action or reminder 6
situation o. and action or reminder 2
situation p. and action or reminder 8
situation q. and action or reminder 6
situation r. and action or reminder 8
situation s. and action or reminder 8
situation t. and action or reminder 7
situation u. and action or reminder 7
situation v. and action or reminder 8
situation w. and action or reminder 2
situation x. and action or reminder 7
situation y. and action or reminder 2
situation z. and action or reminder 8
situation aa. and action or reminder 7
situation bb. and action or reminder 8

The invention also concerns a computer program for providing adaptable parking brake assistance on a vehicle, comprising program code means suitable for implementing the method according to the invention.

The invention also concerns, computer-readable means comprising a recorded program, said computer-readable means comprising program code means suitable for performing the method according to the invention, when said program is run on a computer.

The invention also concerns, a system for providing adaptable parking brake assistance on a vehicle, comprising a parking brake and a set of sensors, and at least one electronic control unit controlling the parking brake and the set of sensors, each sensor being monitored by the at least one electronic control unit to measure a specific parameter, and a set of actuators, each actuator being activated by the at least one electronic control unit to engage a specific action or reminder, characterized in that the at least one electronic control unit is programmed to run a computer program according to the invention.

The invention also concerns, a vehicle comprising a system according to the invention.

Further advantages and advantageous features of the invention are disclosed in the following description and in the dependent claims.

BRIEF DESCRIPTION OF THE DRAWINGS

Below follows a more detailed description of embodiments of the invention cited as examples, in reference to the figures.

DETAILED DESCRIPTION OF EXAMPLE EMBODIMENTS OF THE INVENTION

Figure 1:
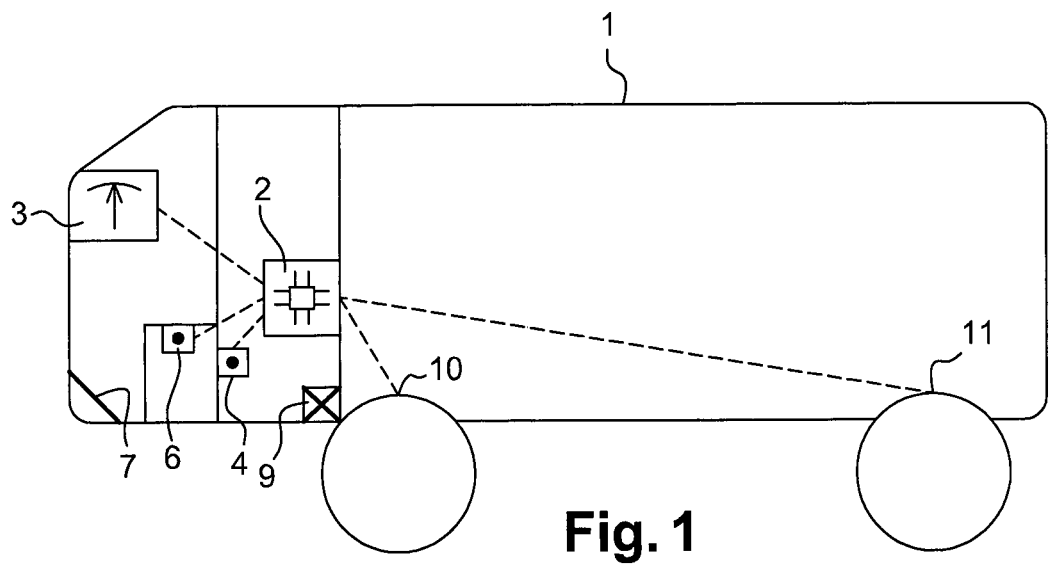
FIG. 1 is a schematic view of the device object of the invention.

FIG. 1 illustrates schematically a truck 1, with an electronic parking brake programmable control unit 2 connected with parking brake actuators 10, 11, and with different sensors such as a speed indicator 3, door switch sensors 4, a sensor detecting presence of the driver on his seat 6, a sensor of the pressure on brake or accelerator pedals 7, gearbox sensors 9. The electronic parking brake programmable control unit 2 can be connected to two to eight parking brake actuators. In another example embodiment of the invention, it may be another electronic control unit (ECU) embedded on the vehicle, not represented on the figure, that is connected to and monitoring the sensors, this other ECU being also connected to the parking brake programmable control unit 2.

The control unit is configured to monitor the sensors to get a real-time picture of the situation concerning the driver on or off his seat, concerning the door switch being on or off, concerning the speed of the truck, concerning the pressure on accelerator or brake pedals, concerning outside temperature, and so on.

It is also configured to interact with and to provide reminders to the driver and to control parking brake actuators, depending on the situations detected.

An important aspect of the invention is the definition of a list of potentially dangerous situations 102, in which an action, chosen among a second list of actions 101, has to be taken. This list of potentially dangerous situations 102 will be established by taking into account a list of characteristic parameters describing each situation. The parameters considered to characterise the different situations are parameters that can be measured or detected by at least one of many, for example n sensors S1, S2, . . . Si, . . . Sn, in a way that is well-known by the person skilled in the art.

In one embodiment of the invention that will be described in more detail, the parameters considered and their associated sensor will be at least one or more of the followings:

parking brake released voluntarily, or involuntarily (PBRV): PBRV=1 if voluntarily, PBRV=0 if not, this information being detected by the electronic control unit of the parking brake; voluntarily implies that park brake has been voluntarily kept released when the engine has been voluntarily stopped by the driver, using the specific key designed for this purpose. Unless the driver decides otherwise, park brake is automatically applied when engine is stopped using the key dedicated to this function. Involuntarily means that the engine is either running or stalled while park brake is released.

driver's seat occupancy sensor (DOS): DOS=1 if the driver is on his seat, DOS=0 if the driver is not on his seat, DOS=10 if the driver has just left his seat, standing up for instance, DOS=01 if the driver is sitting down.

driver's door switch (DDS): DDS=1 if the switch is on, DDS=0 if the switch is off.

accelerator pedal (AP): AP can take any value between 0% and 100%, indicating the level of pressure on the pedal.

brake pedal (BP): BP can take any value between 0% and 100%, indicating the level of pressure on the pedal gear engaged: drive (D) or rear (R), or not engaged, neutral (N).

This list is not imitative.

Figure 2:
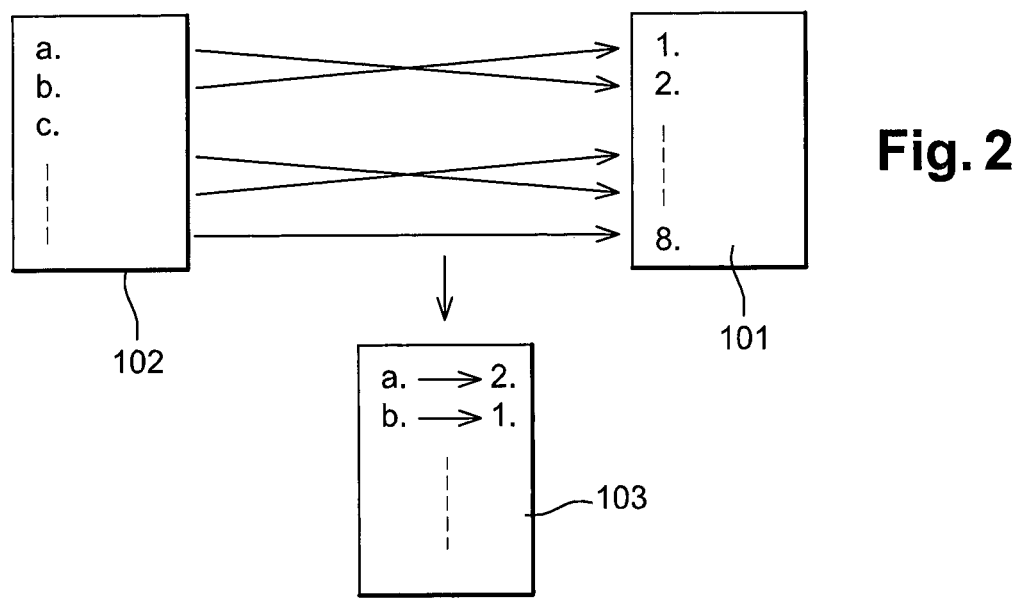
FIG. 2 is schematic representation of the list of relations established between a first list of situations and a second list of actions or reminders, according to a given safety level.

As is represented schematically on FIG. 2, a list of relations 103 is established between a first list 102 of situations, and a second list 101 of actions or reminders, according to a given safety level.

The list of selected dangerous situations 102 is derived from the different possible combinations of the previously considered valued parameters such as for example:

a. PBRV=1, DOS=10, DDS=1, BP=0%: the driver is leaving his seat in the cabin;

b. PBRV=1, DOS=10, DDS=1, BP>0%: the driver is leaving his seat, with the brake pedal being depressed;

c. PBRV=1, DOS=10, DDS=0, BP=0%: the driver is leaving his seat in the cabin, with the door opened;

d. PBRV=1, DOS=10, DDS=0, BP>0%: the driver is leaving his seat, the brake pedal being depressed and the door opened;

e. PBRV=1, DOS=01, DDS=1, BP=0%: the driver is seating after having left his seat in the cabin;

f. PBRV=1, DOS=01, DDS=1, BP>0%: the driver is seating after having left his seat his seat, the brake pedal being depressed;

g. PBRV=1, DOS=01, DDS=0, BP=0%: the driver is seating after having left his seat, with the door opened;

h. PBRV=1, DOS=01, DDS=0, BP>0%: the driver is seating after having left his seat, the brake pedal being depressed and the door opened;

i. PBRV=0, DOS=10, DDS=1, BP=0%, AP=0%: more dangerous than situation a.

j. PBRV=0, DOS=10, DDS=1, BP>0%: more dangerous than situation b.

k. PBRV=0, DOS=10, DDS=1, AP>0%: more dangerous than situation b.
l. PBRV=0, DOS=10, DDS=0, BP=0%, AP=0%: more dangerous than situation c.
m. PBRV=0, DOS=10, DDS=0, BP>0%, D: driver is probably making a manoeuver.
n. PBRV=0, DOS=10, DDS=0, BP>0%, N: danger is low
o. PBRV=0, DOS=10, DDS=0, BP>0%, R: driver is probably making a manoeuver.
p. PBRV=0, DOS=10, DDS=0, AP>0%, D: no danger, driver is making an manoeuver, door open, at low speed;
q. PBRV=0, DOS=10, DDS=0, AP>0%, N: danger is low
r. PBRV=0, DOS=10, DDS=0, AP>0%, R: no danger, driver is making an manoeuver, door open, at low speed;
s. PBRV=0, DOS=01, DDS=1, BP=0%, AP=0%: idem situation i.,j.,k.;
t. PBRV=0, DOS=01, DDS=1, BP>0%: idem situation i.,j.,k.;
u. PBRV=0, DOS=01, DDS=1, AP>0%: idem situation i.,j.,k.;
v. PBRV=0, DOS=01, DDS=0, BP=0%, AP=0%: idem situation l;
w. PBRV=0, DOS=01, DDS=0, BP>0%, D: idem situation m.,o.;
x. PBRV=0, DOS=01, DDS=0, BP>0%, N: idem situation n.,q.;
y. PBRV=0, DOS=01, DDS=0, BP>0%, R: idem situation m.,o.;
z. PBRV=0, DOS=01, DDS=0, AP>0%, D: idem situation p.,r.;
aa. PBRV=0, DOS=01, DDS=0, AP>0%, N: idem situation n.,q.;
bb. PBRV=0, DOS=10, DDS=0, AP>0%, R: idem situation p.,r.;

For each of these potentially more or less dangerous situations belonging to the first list 102, one action or reminder is selected from a second list 101 of possible actions or reminders, creating thus a list of relations 103 between each potentially dangerous situation and one action or reminder to be engaged to ensure a considered level of safety.

The possible actions or reminders belong to one of two categories:
an action, such as a parking brake application, be it immediate or after a timeout, or
a parking brake reminder, such as an alert addressed to the driver, calling for a possible decision of the driver, or a cancellation of the previously activated reminder.

The possible actions belonging to the first category, in this embodiment of the invention, are one of the following:
1. Parking brake auto apply (AA): the park brake is activated.
2. Parking brake auto apply after check+Sound (AACS), if no acknowledgement by driver within a time window.
3. Cancel current action
4. No action The list of possible reminders belonging to the second category, in this embodiment of the invention, is one of the following:
5. Short alert+Pop up display on instrument cluster (SAPU)
6. Long alert+Pop up display on instrument cluster (LAPU)
7. Short alert+Sound+Pop up display on instrument cluster (SASPU)
8. Long alert+Sound+Pop up display on instrument cluster (LASPU)

In a second embodiment of the invention, different levels of safety requirements may be considered.

For each safety level requirement, a specific list of relations 103 between each potentially dangerous situation and one action or reminder to be engaged will be established.

In principle the number of safety level is not limited.

For example in one embodiment of the invention, three levels of safety requirements have been defined:
a first and highest level of safety, where parking brake should be, most of the time, automatically applied when driver stands up at vehicle standstill;
a second and medium level of safety, where parking brake should be, most of the time, automatically applied unless the driver decides the contrary;
a third and basic level of safety, where parking brake should be applied only after confirmation of the driver, provided that the parking brake has been released involuntarily.

The difference between second and third level of safety is that in the second level, if the driver takes no decision the parking brake will be activated, whereas in the third level, if the driver takes no decision, the parking brake will not be activated. In the first and highest level of safety, the driver's decision is not even requested when the parking brake has been released involuntarily.

The action or reminder engaged depends on the dangerousness of the situation, and on the safety level required.

For example, for the basic safety level the list of relations 103 establishes a relation between:
situation a. and action or reminder 3
situation b. and action or reminder 8
situation c. and action or reminder 5
situation d. and action or reminder 8
situation e. and action or reminder 7
situation f. and action or reminder 8
situation g. and action or reminder 7
situation h. and action or reminder 8
situation i. and action or reminder 5
situation j. and action or reminder 8
situation k. and action or reminder 8
situation l. and action or reminder 2
situation m. and action or reminder 6
situation n. and action or reminder 5
situation o. and action or reminder 6
situation p. and action or reminder 8
situation q. and action or reminder 5
situation r. and action or reminder 8
situation s. and action or reminder 7
situation t. and action or reminder 8
situation u. and action or reminder 8
situation v. and action or reminder 8
situation w. and action or reminder 7
situation x. and action or reminder 7
situation y. and action or reminder 7
situation z. and action or reminder 8
situation aa. and action or reminder 7
situation bb. and action or reminder 8

For the medium safety level, the list of relations 103 establishes a relation between:
situation a. and action or reminder 2
situation b. and action or reminder 3
situation c. and action or reminder 2
situation d. and action or reminder 5 situation e. and action or reminder 2
situation f. and action or reminder 3
situation g. and action or reminder 2
situation h. and action or reminder 5
situation i. and action or reminder 1
situation j. and action or reminder 5
situation k. and action or reminder 5
situation l. and action or reminder 1
situation m. and action or reminder 2
situation n. and action or reminder 5
situation o. and action or reminder 2
situation p. and action or reminder 8
situation q. and action or reminder 5
situation r. and action or reminder 8
situation s. and action or reminder 8
situation t. and action or reminder 7
situation u. and action or reminder 7
situation v. and action or reminder 8
situation w. and action or reminder 2
situation x. and action or reminder 7
situation y. and action or reminder 2
situation z. and action or reminder 8
situation aa. and action or reminder 7
situation bb. and action or reminder 8

For the high safety level, the list of relations 103 establishes a relation between:
situation a. and action or reminder 1
situation b. and action or reminder 5
situation c. and action or reminder 2
situation d. and action or reminder 5
situation e. and action or reminder 8
situation f. and action or reminder 7
situation g. and action or reminder 2
situation h. and action or reminder 7
situation i. and action or reminder 1
situation j. and action or reminder 5
situation k. and action or reminder 5
situation l. and action or reminder 1
situation m. and action or reminder 2
situation n. and action or reminder 6
situation o. and action or reminder 2
situation p. and action or reminder 8
situation q. and action or reminder 6
situation r. and action or reminder 8
situation s. and action or reminder 8

Figure 3:
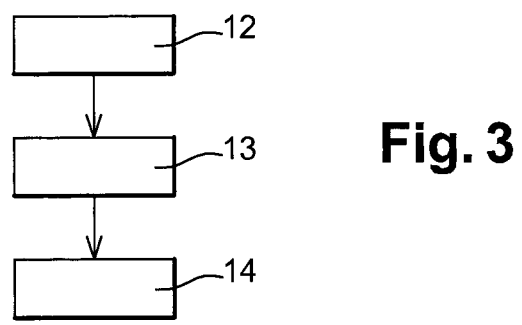
FIG. 3 is a schematic representation of the method.

Thus, as represented in FIG. 3, the method comprises the following three steps 12, 13, 14:
Step 12. determine the values of the parameters measured by the sensors;
Step 13. determine the situation defined by the set of values determined at step 12.
Step 14. engage the action or reminder which is in relation with the situation determined at step 13., according to the list of relations 103, established according to the safety level required.

The invention is also relative to the program running on the control unit 2 and implementing the previously described method.

The invention is also relative to the vehicle comprising a system for providing adaptable parking brake assistance on a vehicle, the vehicle comprising a parking brake programmable control unit and a set of sensors, each sensor being monitored by the control unit or by another ECU embedded on the vehicle and connected to parking brake programmable control unit and measuring a specific parameter, and a set of actuators, each actuator being activated by the control unit to engage a specific action or reminder according to the method previously described.

It is to be understood that the present invention is not limited to the embodiments described above and illustrated in the drawings; rather, the skilled person will recognize that many changes and modifications may be made within the scope of the appended claims.

The invention claimed is:

1. A method of a parking brake assistance system for providing adaptable parking brake assistance on a vehicle, the vehicle comprising a parking brake and the parking brake assistance system comprising a set of sensors, at least one electronic control unit, and a set of actuators, the method comprising:
monitoring, by the at least one electronic control unit, each sensor of the set of sensors configured to measure a respective parameter;
determining values of the respective parameters measured by the set of sensors;
determining, based on the determined values, a situation of a first list of situations, each situation defined by a plurality of the determined values of the parameters measured by the set of sensors; and
engaging, by the at least one electronic control unit, an action of a second list of actions based on a relation of a list of relations, the list of relations establishing, for each of at least one safety level, a relation between each situation of the first list of situations and a respective one of the actions of the second list of actions,
wherein:
the second list of actions comprises actions of the set of actuators comprising at least one action directed to controlling the parking brake and at least one action of providing a reminder; and
the at least one safety level comprises a basic safety level, a medium safety level, and a high safety level;
the respective parameters measured by the set of sensors comprise at least one of:
a. PBRV=1 if parking brake has been released voluntarily, PBRV=0 if parking brake has been released involuntarily;
b. DOS=1 if a driver is on his seat, DOS=0 if the driver is not on his seat, DOS=10 if the driver is changing position from sitting on his seat to standing up; DOS=01 if the driver is changing position from standing up to sitting down;
c. DDS=1 if a driver's door lock is switched on, DDS=0 if the driver's door lock is switched off;
d. AP indicating a level of pressure on an accelerator pedal between 0% and 100%;
e. BP indicating a level of pressure on a brake pedal between 0% and 100%; and
f. D, R, or N indicating that a gear is respectively engaged in drive mode, engaged in rear mode, or not engaged in neutral mode; and
the first list of situations comprises the following situations:
a. PBRV=1, DOS=10, DDS=1, BP=0%;
b. PBRV=1, DOS=10, DDS=1, BP>0%;
c. PBRV=1, DOS=10, DDS=0, BP=0%;
d. PBRV=1, DOS=10, DDS=0, BP>0%;
e. PBRV=1, DOS=01, DDS=1, BP=0%;
f. PBRV=1, DOS=01, DDS=1, BP>0%;
g. PBRV=1, DOS=01, DDS=0, BP=0%;
h. PBRV=1, DOS=01, DDS=0, BP>0%;
i. PBRV=0, DOS=10, DDS=1, BP=0%, AP=0%;
j. PBRV=0, DOS=10, DDS=1, BP>0%;

k. PBRV=0, DOS=10, DDS=1, AP>0%;
l. PBRV=0, DOS=10, DDS=0, BP=0%, AP=0%;
m. PBRV=0, DOS=10, DDS=0, BP>0%, gear is D;
n. PBRV=0, DOS=10, DDS=0, BP>0%, gear is N;
o. PBRV=0, DOS=10, DDS=0, BP>0%, gear is R;
p. PBRV=0, DOS=10, DDS=0, AP>0%, gear is D;
q. PBRV=0, DOS=10, DDS=0, AP>0%, gear is N;
r. PBRV=0, DOS=10, DDS=0, AP>0%, gear is R;
s. PBRV=0, DOS=01, DDS=1, BP=0%, AP=0%;
t. PBRV=0, DOS=01, DDS=1, BP>0%;
u. PBRV=0, DOS=01, DDS=1, AP>0%;
v. PBRV=0, DOS=01, DDS=0, BP=0%, AP=0%;
w. PBRV=0, DOS=01, DDS=0, BP>0%, gear is D;
x. PBRV=0, DOS=01, DDS=0, BP>0%, gear is N;
y. PBRV=0, DOS=01, DDS=0, BP>0%, gear is R;
z. PBRV=0, DOS=01, DDS=0, AP>0%, gear is D;
aa. PBRV=0, DOS=01, DDS=0, AP>0%, gear is N; and
bb. PBRV=0, DOS=10, DDS=0, AP>0%, gear is R;
wherein the parking brake is controlled based on the determined values.

2. The method of claim 1, wherein the second list of actions comprises at least one of:
1. A parking brake auto apply, wherein the parking brake is activated;
2. A parking brake auto apply after checking and a sound, if no acknowledgement by a driver is received within a time window;
3. Cancelling a current action; and
4. No action.

3. The method of claim 1, wherein the second list of actions comprises at least one or more of:
5. A short alert and a pop up;
6. A long alert and a pop up;
7. A short alert, a sound, and a pop up; and
8. A long alert, a sound, and a pop up.

4. The method of claim 1, wherein the second list of actions comprises at least one or more of:
1. A parking brake auto apply, wherein the parking brake is activated;
2. A parking brake auto apply after checking and a sound, if no acknowledgement by a driver is received within a time window;
3. Cancelling a current action; and
4. No action;
wherein the second list of actions comprises at least one or more of the following reminders:
5. A short alert and a pop up;
6. A long alert and a pop up;
7. A short alert, a sound, and a pop up; and
8. A long alert, a sound, and a pop up; and
wherein for the basic safety level the list of relations establishes a relation between:
situation a. and action 3;
situation b. and reminder 8;
situation c. and reminder 5;
situation d. and reminder 8;
situation e. and reminder 7;
situation f. and reminder 8;
situation g. and reminder 7;
situation h. and reminder 8;
situation i. and reminder 5;
situation j. and reminder 8;
situation k. and reminder 8;
situation l. and action 2;
situation m. and reminder 6;
situation n. and reminder 5;
situation o. and reminder 6;
situation p. and reminder 8;
situation q. and reminder 5;
situation r. and reminder 8;
situation s. and reminder 7;
situation t. and reminder 8;
situation u. and reminder 8;
situation v. and reminder 8;
situation w. and reminder 7;
situation x. and reminder 7;
situation y. and reminder 7;
situation z. and reminder 8;
situation aa. and reminder 7; and
situation bb. and reminder 8.

5. The method of claim 1,
wherein the second list of actions comprises at least one or more of:
1. A parking brake auto apply, wherein the parking brake is activated;
2. A parking brake auto apply after checking and a sound, if no acknowledgement by a driver is received within a time window;
3. Cancelling a current action; and
4. No action;
wherein the second list of actions comprises at least one or more of the following reminders:
5. A short alert and a pop up;
6. A long alert and a pop up;
7. A short alert, a sound, and a pop up; and
8. A long alert, a sound, and a pop up; and
wherein for the medium safety level, the list of relations establishes a relation between:
situation a. and action 2;
situation b. and action 3;
situation c. and action 2;
situation d. and action 5;
situation e. and action 2;
situation f. and action 3;
situation g. and action 2;
situation h. and reminder 5;
situation i. and action 1;
situation j. and reminder 5;
situation k. and reminder 5;
situation l. and action 1;
situation m. and action 2;
situation n. and reminder 5;
situation o. and action 2;
situation p. and reminder 8;
situation q. and reminder 5;
situation r. and reminder 8;
situation s. and reminder 8;
situation t. and reminder 7;
situation u. and reminder 7;
situation v. and reminder 8;
situation w. and action 2;
situation x. and reminder 7;
situation y. and action 2;
situation z. and reminder 8;
situation aa. and reminder 7; and
situation bb. and reminder 8.

6. The method of claim 1, wherein the second list of actions comprises at least one or more of:
1. A parking brake auto apply, wherein the parking brake is activated;
2. A parking brake auto apply after checking and a sound, if no acknowledgement by a driver is received within a time window;

3. Cancelling a current action; and
4. No action;

wherein the second list of actions comprises at least one or more of the following reminders:
5. A short alert and a pop up;
6. A long alert and a pop up;
7. A short alert, a sound, and a pop up; and
8. A long alert, a sound, and a pop up; and wherein for the high safety level, the list of relations establishes a relation between:
situation a. and action 1;
situation b. and reminder 5;
situation c. and action 2;
situation d. and reminder 5;
situation e. and reminder 8;
situation f and reminder 7;
situation g. and action 2;
situation h. and reminder 7;
situation i. and action 1;
situation j. and reminder 5;
situation k. and reminder 5;
situation l. and action 1;
situation m. and action 2;
situation n. and reminder 6;
situation o. and action 2;
situation p. and reminder 8;
situation q. and reminder 6;
situation r. and reminder 8;
situation s. and reminder 8;
situation t. and reminder 7;
situation u. and reminder 7;
situation v. and reminder 8;
situation w. and action 2;
situation x. and reminder 7;
situation y. and action 2;
situation z. and reminder 8;
situation aa. and reminder 7; and
situation bb. and reminder 8.

7. A non-transitory computer-readable medium comprising a recorded program for controlling a parking brake assistance system providing adaptable parking brake assistance on a vehicle, the vehicle comprising a parking brake, the parking brake assistance system comprising a set of sensors, at least one electronic control unit, and a set of actuators, and, the computer-readable medium comprising program code which, when executed by the at least one electronic control unit, causes the parking brake assistance system to:

monitor, by the at least one electronic control unit, each sensor of the set of sensors configured to measure a respective parameter;
determine values of the respective parameters measured by the set of sensors;
determine, based on the determined values, a situation of a first list of situations, each situation defined by a plurality of the determined values of the parameters measured by the set of sensors; and
engage, by the electronic control unit, an action of a second list of actions based on a relation of a list of relations, the list of relations establishing, for each of at least one safety level, a relation between each situation of the first list of situations and a respective one of the actions of the second list of actions, wherein:
the second list of actions comprises at least one action directed to controlling the parking brake and at least one action of providing a reminder on an instrument cluster; and
the at least one safety level comprises a basic safety level, a medium safety level, and a high safety level;
the respective parameters measured by the set of sensors comprise at least one of:
a. PBRV=1 if parking brake has been released voluntarily, PBRV=0 if parking brake has been released involuntarily;
b. DOS=1 if a driver is on his seat, DOS=0 if the driver is not on his seat, DOS=10 if the driver is changing position from sitting on his seat to standing up; DOS=01 if the driver is changing position from standing up to sitting down;
c. DDS=1 if a driver's door lock is switched on, DDS=0 if the driver's door lock is switched off;
d. AP indicating a level of pressure on an accelerator pedal between 0% and 100%;
e. BP indicating a level of pressure on a brake pedal between 0% and 100%; and
f. D, R, or N indicating that a gear is respectively engaged in drive mode, engaged in rear mode, or not engaged in neutral mode; and the first list of situations comprises the following situations:
a. PBRV=1, DOS=10, DDS=1, BP=0%;
b. PBRV=1, DOS=10, DDS=1, BP>0%;
c. PBRV=1, DOS=10, DDS=0, BP=0%;
d. PBRV=1, DOS=10, DDS=0, BP>0%;
e. PBRV=1, DOS=01, DDS=1, BP=0%;
f. PBRV=1, DOS=01, DDS=1, BP>0%;
g. PBRV=1, DOS=01, DDS=0, BP=0%;
h. PBRV=1, DOS=01, DDS=0, BP>0%;
i. PBRV=0, DOS=10, DDS=1, BP=0%, AP=0%;
j. PBRV=0, DOS=10, DDS=1, BP>0%;
k. PBRV=0, DOS=10, DDS=1, AP>0%;
l. PBRV=0, DOS=10, DDS=0, BP=0%, AP=0%;
m. PBRV=0, DOS=10, DDS=0, BP>0%, gear is D;
n. PBRV=0, DOS=10, DDS=0, BP>0%, gear is N;
o. PBRV=0, DOS=10, DDS=0, BP>0%, gear is R;
p. PBRV=0, DOS=10, DDS=0, AP>0%, gear is D;
q. PBRV=0, DOS=10, DDS=0, AP>0%, gear is N;
r. PBRV=0, DOS=10, DDS=0, AP>0%, gear is R;
s. PBRV=0, DOS=01, DDS=1, BP=0%, AP=0%;
t. PBRV=0, DOS=01, DDS=1, BP>0%;
u. PBRV=0, DOS=01, DDS=1, AP>0%;
v. PBRV=0, DOS=01, DDS=0, BP=0%, AP=0%;
w. PBRV=0, DOS=01, DDS=0, BP>0%, gear is D;
x. PBRV=0, DOS=01, DDS=0, BP>0%, gear is N;
y. PBRV=0, DOS=01, DDS=0, BP>0%, gear is R;
z. PBRV=0, DOS=01, DDS=0, AP>0%, gear is D;
aa. PBRV=0, DOS=01, DDS=0, AP>0%, gear is N; and
bb. PBRV=0, DOS=10, DDS=0, AP>0%, gear is R;

wherein the parking brake is controlled based on the determined values.

8. A parking brake assistance system for providing adaptable parking brake assistance on a vehicle, the vehicle comprising a parking brake, and the parking brake assistance system comprising a set of sensors, at least one electronic control unit, and a set of actuators, wherein providing adaptable parking brake assistance comprises:

monitoring, by the at least one electronic control unit, each sensor of the set of sensors configured to measure a respective parameter;

determining values of the respective parameters measured by the set of sensors;

determining, based on the determined values, a situation of a first list of situations, each situation defined by a plurality of the determined values of the parameters measured by the set of sensors; and engaging, by the at least one electronic control unit, an action of a second list of actions based on a relation of a list of relations, the list of relations establishing, for each of at least one safety level, a relation between each situation of the first list of situations and a respective one of the actions of the second list of actions, wherein:

the second list of actions comprises at least one action directed to controlling the parking brake and at least one action of providing a reminder; and the at least one safety level comprises a basic safety level, a medium safety level, and a high safety level;

the respective parameters measured by the set of sensors comprise at least one of:
  a. PBRV=1 if parking brake has been released voluntarily, PBRV=0 if parking brake has been released involuntarily;
  b. DOS=1 if a driver is on his seat, DOS=0 if the driver is not on his seat, DOS=10 if the driver is changing position from sitting on his seat to standing up; DOS=01 if the driver is changing position from standing up to sitting down;
  c. DDS=1 if a driver's door lock is switched on, DDS=0 if the driver's door lock is switched off;
  d. AP indicating a level of pressure on an accelerator pedal between 0% and 100%;
  e. BP indicating a level of pressure on a brake pedal between 0% and 100%; and
  f. D, R, or N indicating that a gear is respectively engaged in drive mode, engaged in rear mode, or not engaged in neutral mode; and the first list of situations comprises the following situations:
  a. PBRV=1, DOS=10, DDS=1, BP=0%;
  b. PBRV=1, DOS=10, DDS=1, BP>0%;
  c. PBRV=1, DOS=10, DDS=0, BP=0%;
  d. PBRV=1, DOS=10, DDS=0, BP>0%;
  e. PBRV=1, DOS=01, DDS=1, BP=0%;
  f. PBRV=1, DOS=01, DDS=1, BP>0%;
  g. PBRV=1, DOS=01, DDS=0, BP=0%;
  h. PBRV=1, DOS=01, DDS=0, BP>0%;
  i. PBRV=0, DOS=10, DDS=1, BP=0%, AP=0%;
  j. PBRV=0, DOS=10, DDS=1, BP>0%;
  k. PBRV=0, DOS=10, DDS=1, AP>0%;
  l. PBRV=0, DOS=10, DDS=0, BP=0%, AP=0%;
  m. PBRV=0, DOS=10, DDS=0, BP>0%, gear is D;
  n. PBRV=0, DOS=10, DDS=0, BP>0%, gear is N;
  o. PBRV=0, DOS=10, DDS=0, BP>0%, gear is R;
  p. PBRV=0, DOS=10, DDS=0, AP>0%, gear is D;
  q. PBRV=0, DOS=10, DDS=0, AP>0%, gear is N;
  r. PBRV=0, DOS=10, DDS=0, AP>0%, gear is R;
  s. PBRV=0, DOS=01, DDS=1, BP=0%, AP=0%;
  t. PBRV=0, DOS=01, DDS=1, BP>0%;
  u. PBRV=0, DOS=01, DDS=1, AP>0%;
  v. PBRV=0, DOS=01, DDS=0, BP=0%, AP=0%;
  w. PBRV=0, DOS=01, DDS=0, BP>0%, gear is D;
  x. PBRV=0, DOS=01, DDS=0, BP>0%, gear is N;
  y. PBRV=0, DOS=01, DDS=0, BP>0%, gear is R;
  z. PBRV=0, DOS=01, DDS=0, AP>0%, gear is D;
  aa. PBRV=0, DOS=01, DDS=0, AP>0%, gear is N; and
  bb. PBRV=0, DOS=10, DDS=0, AP=0%, gear is R;

wherein the parking brake is controlled based on the determined values.

9. A vehicle comprising a parking brake and a parking brake assistance system for providing adaptable parking brake assistance, the parking brake assistance system comprising a set of sensors, at least one electronic control unit, and a set of actuators, wherein providing adaptable parking brake assistance comprises:

monitoring, by the at least one electronic control unit, each sensor of the set of sensors configured to measure a respective parameter;

determining values of the respective parameters measured by the set of sensors;

determining, based on the determined values, a situation of a first list of situations, each situation defined by a plurality of the determined values of the parameters measured by the set of sensors; and engaging, by the at least one electronic control unit, an action of a second list of actions based on a relation of a list of relations, the list of relations establishing, for each of at least one safety level, a relation between each situation of the first list of situations and a respective one of the actions of the second list of actions, wherein:

the second list of actions comprises at least one action directed to controlling the parking brake and at least one action of providing a reminder; and the at least one safety level comprises a basic safety level, a medium safety level, and a high safety level;

the respective parameters measured by the set of sensors comprise at least one of:
  a. PBRV=1 if parking brake has been released voluntarily, PBRV=0 if parking brake has been released involuntarily;
  b. DOS=1 if a driver is on his seat, DOS=0 if the driver is not on his seat, DOS=10 if the driver is changing position from sitting on his seat to standing up; DOS=01 if the driver is changing position from standing up to sitting down;
  c. DDS=1 if a driver's door lock is switched on, DDS=0 if the driver's door lock is switched off;
  d. AP indicating a level of pressure on an accelerator pedal between 0% and 100%;
  e. BP indicating a level of pressure on a brake pedal between 0% and 100%; and
  f. D, R, or N indicating that a gear is respectively engaged in drive mode, engaged in rear mode, or not engaged in neutral mode; and the first list of situations comprises the following situations:
  a. PBRV=1, DOS=10, DDS=1, BP=0%;
  b. PBRV=1, DOS=10, DDS=1, BP>0%;
  c. PBRV=1, DOS=10, DDS=0, BP=0%;
  d. PBRV=1, DOS=10, DDS=0, BP>0%;
  e. PBRV=1, DOS=01, DDS=1, BP=0%;
  f. PBRV=1, DOS=01, DDS=1, BP>0%;
  g. PBRV=1, DOS=01, DDS=0, BP=0%;
  h. PBRV=1, DOS=01, DDS=0, BP>0%;
  i. PBRV=0, DOS=10, DDS=1, BP=0%, AP=0%;
  j. PBRV=0, DOS=10, DDS=1, BP>0%;
  k. PBRV=0, DOS=10, DDS=1, AP>0%;
  l. PBRV=0, DOS=10, DDS=0, BP=0%, AP=0%;
  m. PBRV=0, DOS=10, DDS=0, BP>0%, gear is D;
  n. PBRV=0, DOS=10, DDS=0, BP>0%, gear is N;
  o. PBRV=0, DOS=10, DDS=0, BP>0%, gear is R;
  p. PBRV=0, DOS=10, DDS=0, AP>0%, gear is D;
  q. PBRV=0, DOS=10, DDS=0, AP>0%, gear is N;

r. PBRV=0, DOS=10, DDS=0, AP>0%, gear is R;
s. PBRV=0, DOS=01, DDS=1, BP=0%, AP=0%;
t. PBRV=0, DOS=01, DDS=1, BP>0%;
u. PBRV=0, DOS=01, DDS=1, AP>0%;
v. PBRV=0, DOS=01, DDS=0, BP=0%, AP=0%;
w. PBRV=0, DOS=01, DDS=0, BP>0%, gear is D;
x. PBRV=0, DOS=01, DDS=0, BP>0%, gear is N;
y. PBRV=0, DOS=01, DDS=0, BP>0%, gear is R;
z. PBRV=0, DOS=01, DDS=0, AP>0%, gear is D;
aa. PBRV=0, DOS=01, DDS=0, AP>0%, gear is N; and
bb. PBRV=0, DOS=10, DDS=0, AP>0%, gear is R;

wherein the parking brake is controlled based on the determined values.

\* \* \* \* \*